(12) United States Patent
Miller et al.

(10) Patent No.: US 8,249,234 B2
(45) Date of Patent: Aug. 21, 2012

(54) DYNAMIC CONFIGURATION OF CONFERENCE CALLS

(75) Inventors: Thomas Ray Miller, Colorado Springs, CO (US); Lee Inman, Colorado Springs, CO (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 1171 days.

(21) Appl. No.: 11/776,706

(22) Filed: Jul. 12, 2007

(65) Prior Publication Data

US 2009/0016514 A1    Jan. 15, 2009

(51) Int. Cl.
*H04M 3/42* (2006.01)
*H04L 12/16* (2006.01)
*H04Q 11/00* (2006.01)
*G06F 15/16* (2006.01)

(52) U.S. Cl. ......... 379/202.01; 379/201.12; 379/203.01; 379/204.01; 370/260; 370/261; 370/262; 455/416; 709/204

(58) Field of Classification Search ............. 379/202.01, 379/201.01, 203.01, 204.01, 205.01, 201.12; 455/416; 370/260, 261, 262, 259; 709/204
See application file for complete search history.

(56) References Cited

U.S. PATENT DOCUMENTS

| | | | |
|---|---|---|---|
| 2005/0015444 A1* | 1/2005 | Rambo | 709/204 |
| 2005/0078612 A1* | 4/2005 | Lang | 370/260 |
| 2009/0093240 A1* | 4/2009 | Lang | 455/416 |

* cited by examiner

*Primary Examiner* — Thjuan K Addy
(74) *Attorney, Agent, or Firm* — Smith Risley Tempel Santos LLC

(57) ABSTRACT

A conferencing system that can be configured by a host, and then reconfigured on the fly, in real time. The host initially provides configuration information to the system to define the initial operation of the conference call. The host can then update this information during the conference call to reconfigure the conference call. For instance, the information may include a question set. The initial question set is presented to participants as they enter the conference call. When the configuration information is changed by providing a new question, the new question is then presented to the participants in the conference call.

18 Claims, 3 Drawing Sheets

DYNAMIC CONFIGURATION OF CONFERENCE CALLS

RELATED APPLICATIONS

This application is related to, and hereby incorporates by reference, the U.S. patent application that was filed concurrently herewith on Jul. 12, 2007, assigned Ser. No. 11/776, 681, and is entitled SERVICES RELATED TO CONFERENCE CALLS

BACKGROUND OF THE INVENTION

Imagine a telephone technology that allows more than one party to be on a telephone call at the same time—you might want to call it a conference call. Now, imagine trying to explain this technology to your grandfather or grandmother that grew up in the 20's. They would look at you like you are crazy. Not because you were blowing them away with a deep, technological description of a new innovation but rather, they would think you were crazy because it would sound very much like the telephone systems they grew up with—the party lines. It was not all that long ago that you could actually find party line service being offered and used by telephone customers. In case you are not aware of it, prior to 1970, some rural residential customers and even city residential customers did not have private telephone lines running to their homes. Rather, a single line was used by multiple homes, sometimes as many as 20 or more homes. With a party line, while you are in the middle of a telephone conversation, your neighbor could simply pick up his or her telephone and listen to your conversation. Similarly, if you wanted to place a call, when you picked up the telephone receiver you may find that someone else was already engaged in a telephone call at the time. To use the telephone, you would have to convince them to hang up and free up the line for your use or, simply wait. So, you can see why a high-level explanation of a conference call system would sound crazy to your grandparents.

However, in today's world, where every house has one or more private lines, businesses are spread out across the country and the world, and decisions need to be made in a timely manner, one can appreciate the existence of conference calling capabilities. Conference call technology has migrated through the years from 3-way calling, to today's highly complex conference call systems that enable users to setup a dial-in conference call number and an access code to enable call conferencing. In operation, a user dials the conference call number and enters or states the access code to gain access to the multi-party conference call.

As with most advances in technology, the advancements in conference call technology were not immune to the "VCR Syndrome". The VCR syndrome refers to the scenario in which a great technological advancement is in essence, unavailable to many users simply because it is too complicated to learn. Although user interfaces have been introduced and deployed for conference call systems, there is still a need in the art for a new user interface that makes the process of setting up and managing a conference call more accessible to a wider range of users.

In a business setting, meetings are simply unavoidable. However, the more travel time that can be saved through the use of conference calls, the more time that can be spent working on the company's bottom line. As many will be aware, simply introducing technology does not necessarily mean that it will be adopted by the public. Many times the technology has to be dummied down to make it easier to use. Other characteristics that help a new technology to be adopted include being reliable, intuitive, seamless, ambient and non-disruptive to normal daily routines. It is beneficial for a technology not just to provide a solution, but to provide a solution that eases the time schedule crunch felt by many business persons. In the world of conferencing, it is desirable for a system that not only facilitates the conference, but that makes interfacing and participating in the conference an easy task and that can provide solutions to other problems that can either arise in a conferencing scenario or that can be uniquely met through a conferencing system. Thus, there is a need in the art for a conference call system that can address these desires.

BRIEF SUMMARY OF THE INVENTION

The present invention addresses the above-described needs in the art, as well as others by providing a conference calling system that can receive configuration information before the start of the conference, during the conference, or both, and operate the conference call in accordance with the configuration information as well as to potentially augment the configuration based on responses received from participants and other activities that occur during the conference call.

One embodiment of the invention includes a method to provide configurable conference calls. A host gains access to the reservation system in one or more of a variety of manners and provides conference call configuration information to the system. The configuration information can take on a variety of forms and functions. For instance, the configuration information may be a set of questions to be presented to participants, access rights for various participants, default status settings for participants, etc. When the entry of a participant is detected, the participant is requested to provide information to identify the participant. Such information may be a user ID, the participants name, a certain code, or the like. The conference call is configured in accordance with the configuration information. In one embodiment, the conference, or aspects of the conference, may be configured based on the configuration information as well as the information provided by the participant. During the conference call, the host may provide further configuration information. This information is then used to reconfigure the conference call in progress.

In a particular embodiment, the configuration information includes question sets to present to the participants. In one embodiment the questions presented may depend on the identification of the participant, the number of participants, the responses of the participant or other factors. In another embodiment, the questions may have attributes associated with them to indicate how the system is to process the questions. For instance, a question may be tagged to be immediately delivered to participants, or to only a select number of participants or only after a particular point in the conference call, or in response to a signal, etc.

The present invention may be implemented within a system that includes a conference manager and a delivery module. The conference manger interfaces to a telephone network and controls access to and monitoring of the conference call. The conference manager operates to receive conference configuration information and then operates the conference in accordance with the conference configuration information. Part of the configuration information may include the delivery of certain content to one or more of the participants. The content can be delivered, in some embodiments through the telecommunication channels used to establish the conference call or, may be delivered through another channel, such as through email, text messaging, posting on a web site, blogs, etc. For instance, the configuration information may include a question set and the questions can be recited to a participant directly over the telephone channel or, can be sent to him or her via a data channel or an alternate voice channel.

One embodiment of the invention allows for real-time responses to revise configuration information. For instance, if a new question is received during a conference call, the question can be immediately presented to the participants. Such a feature is useful for providing a polling or silent voting feature to embodiments of the present invention.

DETAILED DESCRIPTION OF EMBODIMENTS OF THE INVENTION

Embodiments of the present invention are directed towards an improved conference calling system that operates to not only provide a conference calling technology, but that may also gather information about and from the participants and that interfaces/interacts with participants to dynamically configure the conference call. More specifically, when setting up a conference call, one aspect of the present invention is to enable a conference call facilitator to define a set of information that is to be gathered from the various participants, as well as to identify the participants and present, record or otherwise utilize information pertaining to the particular participants. Embodiments of the present invention also operate to dynamically adjust the information gathered from and/or presented to the user based on various events that occur during, after or prior to the conference call.

Figure 1:
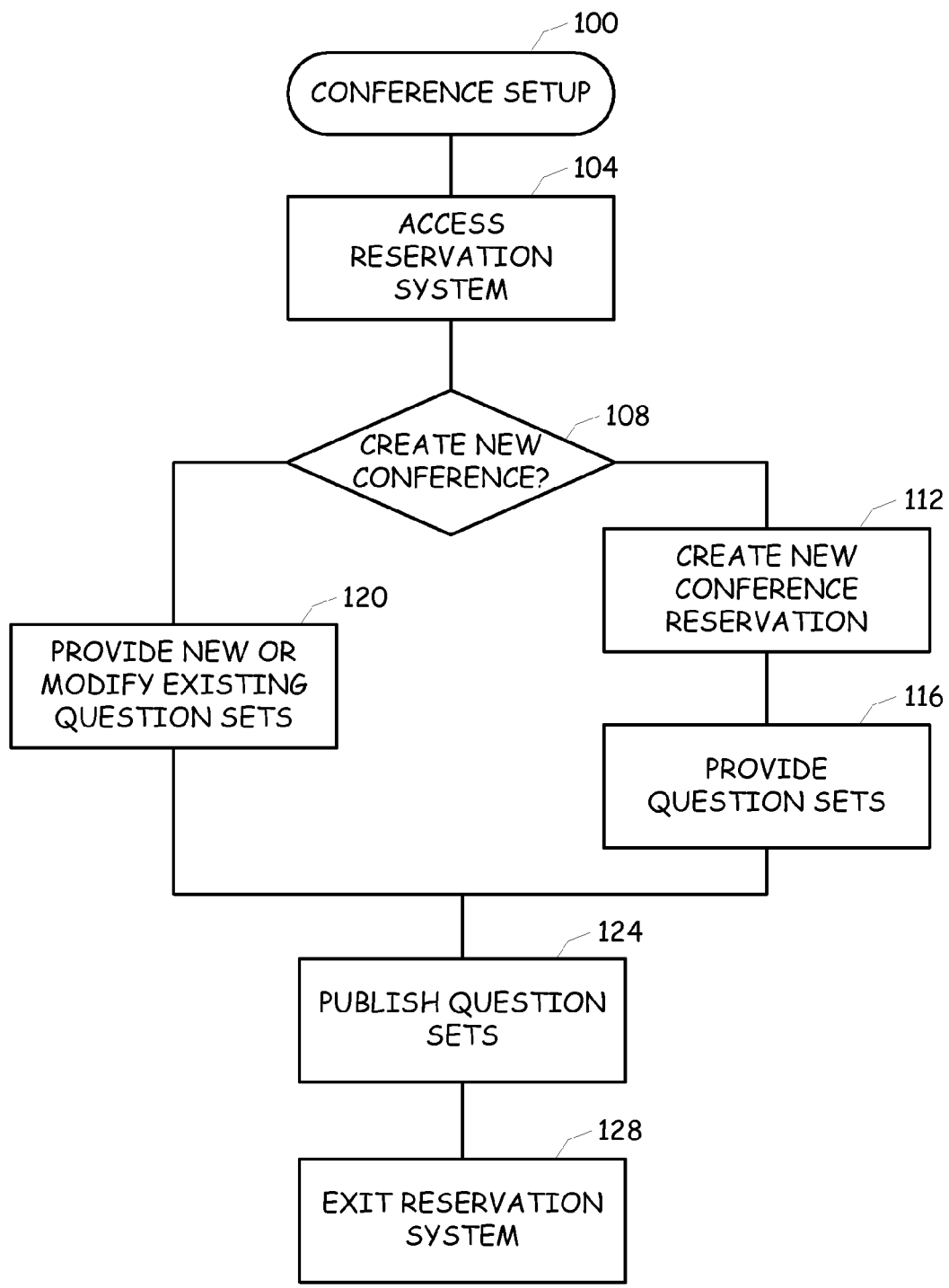
FIG. 1 is a flowchart diagram of the general steps involved in one embodiment of the present invention for setting up a conference call.

FIG. 1 is a flowchart diagram of the general steps involved in one embodiment of the present invention for setting up a conference call. Similar to many conference call systems, the user, coordinator, facilitator or host (collectively the host) of the conference call interfaces to a reservation system to setup the conference call 100. Initially, the host accesses the reservation system 104. This access can be attained by calling into a voice activated system, accessing the system via the Internet or simply calling a conference call setup administrator. Thus, various embodiments of the present invention may use reservations systems that are accessed through a dial-in system with voice commands, DTMF control or user operator controlled, web accessed systems, faxed in requests, email/form provisioned systems, or the like.

Once a host accesses the reservation system, the host can select to either create a new conference or to modify a previously created conference 108. If the host is creating a new conference 112, the host can identify various logistical aspects of the conference call such as the time and date of the conference call. In addition, the host may receive a call-in number and access code for the conference. In various embodiments of the present invention, the host may be allowed to identify the parties to participate in the conference call, as well as pertinent information about the participants. The creation of the conference call reservation may include additional information as well and those skilled in the art will be familiar with the typical requirements for making a conference call reservation. Although specific characteristics of this aspect of the present invention may be considered novel, in the broadest aspect the present invention is not limited to any particular method or procedure for setting up the reservation for the conference call.

In addition to setting up the conference call reservation, the host may provide additional operational characteristics pertaining to the conference call. As a non-limiting example, the operational characteristics may be a question set that is to be presented to conference call participants as they connect into the conference 116. As another non-limiting example, the host may provide a question set and define various operational characteristics of the conference call based on how the questions are answered. In addition, the host may provide a default definition of the characteristics of the conference and then, based on the identity of the various participants, the number of participants, the length of the conference call, the types of information presented during the conference call, as well as other items, change one or more of the default characteristics.

Returning to decision block 108, if the host is modifying a previously created conference or partially created conference, the host is able to modify or enter additional information pertaining to the conference 120. For instance, the host may modify the question set, add additional questions, change the entire question set etc. In addition, the host may modify how the operation of the conference call is to proceed based on the answers to the questions. Another aspect of the present invention is that the question set or operational characteristics of the conference call can be modified in real time. For example, if as the conference call progresses, it looks like confidential information is going to be presented to the participants, the host can enter the conference call set up and create a question that can be posed to each participant. For instance, the question may ask:

Do you have a signed NDA on file giving you access to this information?

Alternatively, the question may be to solicit an agreement by the parties. For instance, the question may ask:

Participant A has requested to disclose certain confidential information; a non-disclosure agreement has been emailed to you, please review the terms of the agreement and if you agree to the terms, enter a 1 on your dialing pad.

When the host has entered information defining the operational characteristics of the conference all, whether for a new conference call or through amending the conference call, then the modifications are then published 124. Finally, the host exits the reservation system 128.

Figure 2:
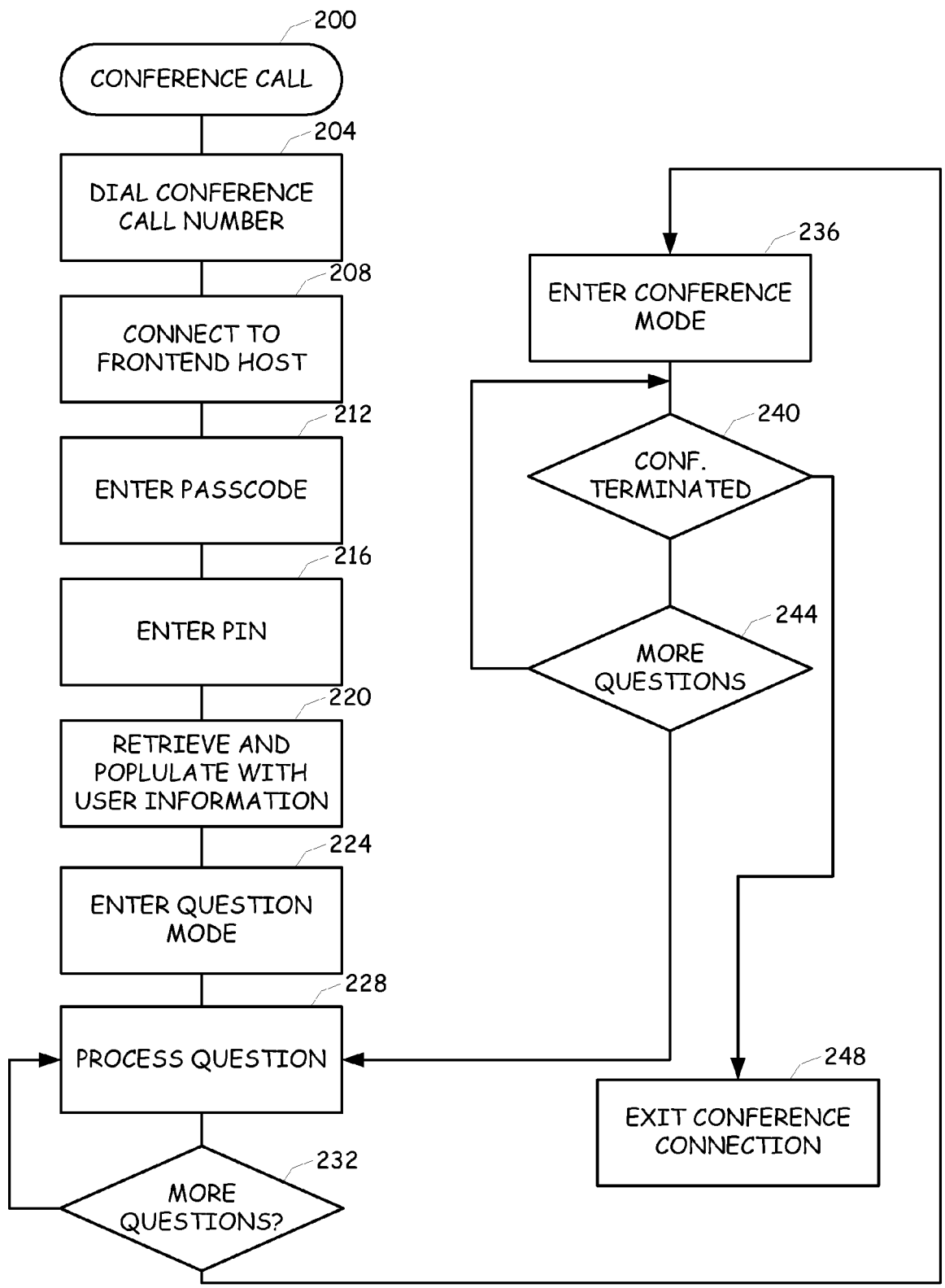
FIG. 2 is a flowchart diagram illustrating the operation of an embodiment of the present invention from the participant's perspective.

FIG. 2 is a flowchart diagram illustrating the operation of an embodiment of the present invention from the participant's perspective. Initially, the process 200 includes the participant dialing a particular number associated with the conference call 204. Once the call processing is completed, the user is connected to the front-end host of the conferencing system 208. At this point, in some embodiments but not required for all embodiments, the user may be required to enter a pass code, conference code or identifier 212 and possibly a personal identification number PIN 216. Similarly, the user may be required to verbally state his or her name and pass code. Based on the information entered the conference system can retrieve information associated with the particular user or associated with other information provided by the user. The information retrieved can be used to populate various parameters of the conference call system 220.

At this point, the conferencing system enters into a self/assisted configuration mode, if it has not already done so, or if it has not defaulted to such mode. The self/assisted configuration mode, in one embodiment is a question mode 224. In the question mode, the questions presented in the question set can be retrieved and posed to the participant. The participant responds or processes the question 228 and if no further questions are available or required 232, the question mode is exited and a conference mode is entered 236. However, if additional questions are available or required, the participant receives and processes the next question 228. This process continues until all of the questions have been exhausted or there is no further requirement of questions at this time.

While in conference mode, two events may happen. First of all the conference may be terminated 240. If the conference is terminated 240, such as if the participant hangs up or some other terminating event occurs, then the conference connection is exited 244. If the conference is not terminated, the conference mode remains active unless there is a configuration changing event. For instance, in the above-provided example where the conference initially included a question mode, if additional questions become available 248, then the question mode can be re-entered 228. Processing then continues as described above.

The present invention has been generally described and is now further illustrated by providing a few examples of features, aspects and embodiments of the present invention. As previously mentioned, one aspect of the present invention is to allow a host to provide operational characteristics of a conference call. One way in which this is done is by providing a set of questions that are presented to conference participants when connecting to the conference call system and possibly even during and following a conference call. In such an embodiment, the host provides a question set during the conference reservation process, and the question sets are presented to the participants by a front end greeter. For instance, upon accessing the conference call system, the participant may be asked the following questions:

What is your name?
What division are you assigned to?
What is your department ID?

One aspect of the present invention is that the operational characteristics of the conference call can be changed or augmented based on the answers provided by the participants. For instance, questions that can be answered using DTMF entries can easily be deciphered by a DTMF decoder and then other actions can be taken based on the answers. Similarly, a voice activated technology can be employed to detect answers provided by the participants, decipher the answers and modify the operation of the system based on the answers.

Various embodiments may operate to modify or augment the conference call in a variety of manners. A few non-limiting examples of such modifications or augmentations are provided herein and, although they may be considered novel either alone or in combination with others, the broadest protection afforded to the present invention is not limited to any particular capability or combination thereof.

For example, in response to an answer from a participant, the questions to be further presented to the participant may be modified or changed. More specifically, if the participant is requested to enter his or her employee identification number, the system may access a privileges database to determine the type of role that that participant may have in the conference call. The participant may be involved as a listen-only participant or, the participant may be required to indicate that he or she has completed certain tasks prior to being allowed to participate as a speaker during the conference call. As a more detailed example, the participant may be asked to indicate whether he or she has read the publications or documents related to the subject of the conference call. If the participant has not, then the participant may be barred from participating as a speaker and may be limited to a listener.

As another example, the identity of the other parties involved in the conference call may be disclosed or concealed based on the clearance level of the various participants. When connecting to the conference, a participant may be requested to enter a clearance level password. Depending on what the password is, the privileges and accesses of the participant can be defined.

As another example, materials may be presented to the user based on the way they answer the questions. In fact, a participant may be asked if he or she has received a copy of the presentation. If the participant answers "no", the system may ask the participant if they would like a copy of the presentation. If the participant answers "yes", the system may automatically email the presentation to the participant or otherwise deliver the presentation.

Another aspect of the present invention is that the operational characteristics of the conference call system can be modified in real-time. A few specific examples of this aspect of the present invention have already been described. But in general, it is important to understand that an embodiment of the invention may broadly include the ability for a host to access the conference system and reconfigure the system to immediately or dynamically control an active conference call. In an embodiment that includes a question set, this aspect of the present invention enables a host to modify, change or add questions to the question set. As such, using this aspect of the present invention, the host can at any time during a conference call, cause the conference call, either for all participants, a plurality of participants or a single participant, to enter into question mode and require the participant(s) to respond to the question. The audio presented to the user may continue in one embodiment and in another embodiment the audio may be muted.

Another example of this aspect of the present invention is to toggle participants between a listen only and a full participant mode. Thus, the host can access the conference call system and depending on the flow of the conference call, mute various participants to prevent them from talking and lengthening the duration of the conference call. Similarly, the participants can be toggled between a muted mode and an unmuted mode. For instance, if the host detects that confidential information is, or is about to be disclosed, the host can mute the audio for particular participants if they are not authorized to hear the confidential information.

Another aspect of the present invention is that the operational characteristics can be used to provide polling or silent voting. For instance, it has already been described that the conference host can regain access to the conference reservation system and modify the question set or otherwise configure the operation of the conference call. The ability to provide polling or silent voting is an example of this capability. During a conference call, the conversation may lead to a vote (i.e., a board of directors may need to vote on passing an issue or a group of employees may need to vote on hiring a new candidate, etc.). The host or another designated person may cause the questions to be posed to the participants. As illustrated above, the participants would each revert back to the question mode, have the question or questions posed to them, and upon processing the questions can return to the conference call mode. One could easily imagine a multitude of uses for such a feature. For instance, this feature could be used to provide remote testing for students, obtain opinion feedback from a host of individuals simultaneously, or the like. With regards to the opinion feedback example, a conference call can be set up to allow a large number of participants to call in and be placed in a listen only mode. During the call, a moderated can recite certain statements and then periodically questions can be posed to the audience to solicit the feedback.

It should be appreciated that although the invention has been described in an embodiment that includes a question mode or reconfiguration mode, and a conference call mode, that these two modes do not have to be mutually exclusive, although the concept of making them mutually exclusive may in and of itself be considered an element of an exemplary embodiment of the invention. However, other embodiments may simply have conceptual modes that actually exist simultaneously. Other embodiments may use a hybrid approach, for instance, the participants may still hear the conference call audio while they are waiting to answer the question. In such an embodiment, the questions posed to the various participants may be presented in a manner other than over the conference call. For instance, the questions can be sent to the participants vie email, instant messaging, text messaging, posted on a web site, etc.

Figure 3:
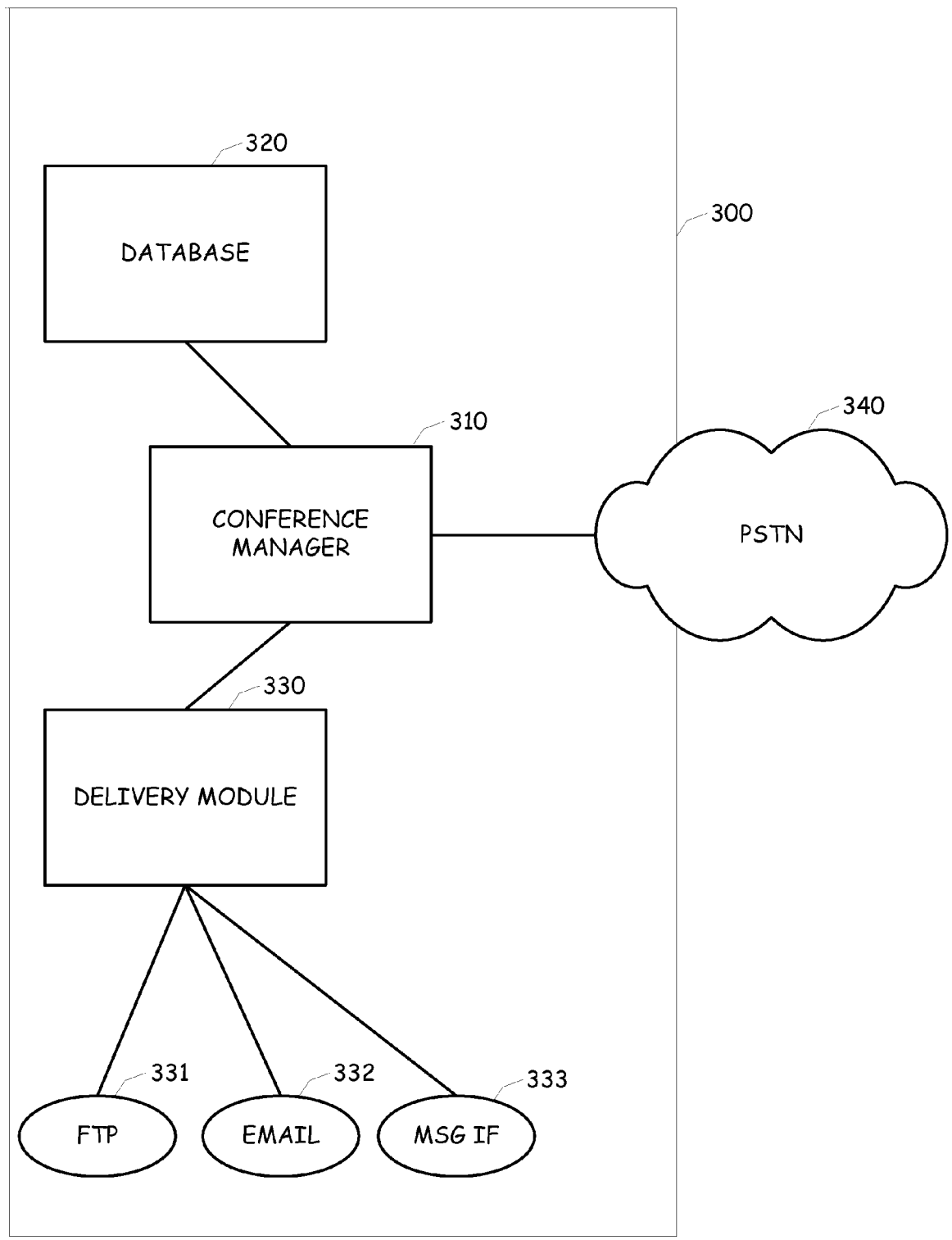
FIG. 3 is a block diagram illustrating one exemplary environment that is suitable for various embodiments of the present invention.

FIG. 3 is a block diagram illustrating one exemplary environment that is suitable for various embodiments of the present invention. The conference call system 300 is shown as including a conference manager 310 that interfaces to a database 320, a delivery module 330 and the public switched telephone network PSTN or other network 340. It should be appreciated that the illustrated block diagram is simply a logical breakdown of some of the functions applicable to various embodiments of the present invention. Although the illustrated embodiment may be novel in and of itself, the present invention is not limited to the illustrated function blocks, the illustrated division or separation of the functionality, or only to the listed functions. Rather, the illustrated embodiment was selected as the most suitable illustration to describe the various aspects, features and functions of the present invention. The conference manager 310 serves as the interface to hosts that are desiring to set up and/or modify a conference call, as well as to hosts and participants in joining and participating in a conference call. Thus, the steps illustrated in FIGS. 1 and 2 that involve an interface to a user are typically embodied in the conference manager block 310.

If the host setting up the conference wishes to enter a question set or to modify a question set for conference participants, the host provides such instructions through the user interface of the conference manager 310. The conference manager 310 then interfaces with the database 320 to store or modify the already stored questions.

The conference manager 310 interfaces to the delivery module 330 for the purposes of delivering questions, materials, or other items in various embodiments of the present invention. The host can optionally configure the conference to use one or more of the delivery mechanisms. The illustrated embodiment shows three delivery routes: FTP 331, email 332 and messaging 333. It will be appreciated that a variety of other techniques may also be employed in other embodiments of the present invention or the delivery mechanism may simply be over the telecommunications channel established for the conference call, or even a separate telecommunications channel.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art It will be appreciated by persons skilled in the art that the present invention is not limited by what has been particularly shown and described herein above. Rather the scope of the invention is defined by the claims that follow.

What is claimed is:

1. A method for providing a configurable conference call, the method comprising the steps of:
   providing access to a conference reservation system;
   receiving conference call configuration information;
   detecting the entry of a particular participant into the conference call;
   entering a query mode in response to an input received from a conference host during an active conference;
   requesting the particular participant to provide select information;
   presenting at least one response from the particular participant to the conference host; and
   uniquely configuring the active conference call for the particular participant in accordance with the select information provided by the particular participant.

2. The method of claim 1, wherein the step of receiving conference call configuration information further comprises receiving a question set.

3. The method of claim 1, wherein the step of uniquely configuring the active conference call further comprises adjusting an operational characteristic of the conference call.

4. The method of claim 3, wherein the step of uniquely configuring the active conference call further comprises the steps of:
   presenting a particular question to a participant;
   receiving a response to the particular question from the participant; and
   selecting a next question to present to the participant based at least in part on the response received to the particular question.

5. The method of claim 1, wherein the step of uniquely configuring the active conference call further comprises presenting questions from a question set to the particular participant based at least in part on the configuration information and the select information provided by the particular participant.

6. The method of claim 5, wherein the step of presenting questions from the question set to the particular participant further comprises the steps of:
   presenting a particular question to the particular participant;
   receiving a response to the particular question from the particular participant; and
   selecting a next question to present to the particular participant based at least in part on the response received to the particular question.

7. The method of claim 1, further comprising, the steps of:
   selectively adjusting a mute control to prevent an identified participant from speaking or listening to other conference participants.

8. The method of claim 2, further comprising the step of receiving a change to the question set.

9. The method of claim 8, wherein the step of receiving a change to the question set comprises receiving a new question and wherein the step of reconfiguring the conference call in accordance with the change to the question set comprises presenting the new question to the conference call participants.

10. The method of claim 8, wherein the step of receiving a change to the question set comprises receiving a new question with associated attributes and wherein the step of reconfiguring the conference call in accordance with the change to the question set comprises presenting the new question to the conference call participants in accordance with the associated attributes.

11. The method of claim 10, wherein the associated attributes indicate that the question should immediately be presented to the participants and the step of reconfiguring the conference further comprises immediately presenting the new question to the conference participants.

12. A method for providing a configurable conference call, the method comprising the steps of:
   providing access to a conference reservation system;
   receiving conference call configuration information;
   configuring a conference call in accordance with the conference call configuration information;
   detecting the entry of a particular participant into an ongoing conference call;
   requesting the particular participant to provide select information including an indication of their preparation for the conference call;
   receiving further conference call configuration information during the ongoing conference call, wherein the further conference call configuration information is based on the select information; and
   reconfiguring the conference call by selectively adjusting a mute control to prevent the particular participant from speaking.

13. The method of claim 12, wherein the configuration information includes one or more questions to be presented to one or more participants and, the step of configuring the conference call comprises presenting the one or more questions.

14. The method of claim 13, further comprising the steps of:
   receiving a response to a particular question presented to a particular participant;
   selecting a next question based on the received response; and
   presenting the next question the particular participant.

15. A system for providing configurable conference calls, the system comprising:
   a conference manager that interfaces to a telephone network and controls the access to and monitoring of a conference call, receives conference configuration information and operates the conference call in accordance with the conference configuration information, the conference manager responsive to an input received from a conference host during an active conference, the conference manager placing the conference into a query mode that suspends the conference for one or more participants until the one or more participants responds; and
   a delivery module that operates to deliver content to a participant of a conference call in accordance with the conference configuration information, wherein the delivered content may vary among participants of a given conference call.

16. The system of claim 15, wherein the conference configuration information includes a question set for presentation to participants and the delivery module operates to deliver content to a particular participant based on the particular participant's response to one or more of the questions in the question set.

17. The system of claim 16, wherein the delivery module operates to provide one or more questions to the participant by delivering an audible message over a telecommunication line to the participant.

18. The system of claim 16, wherein the delivery module operates to provide one or more questions to the participant by delivering the message via a channel other than the telecommunication lines used for the conference call.

* * * * *